United States Patent [19]
Crofts

[11] Patent Number: 4,620,509
[45] Date of Patent: Nov. 4, 1986

[54] TWIN-FLOW COOLING SYSTEM
[75] Inventor: John G. Crofts, Columbus, Ind.
[73] Assignee: Cummins Engine Company, Inc., Columbus, Ind.
[21] Appl. No.: 763,021
[22] Filed: Aug. 5, 1985
[51] Int. Cl.[4] .............................. F01P 3/12; F01P 5/10
[52] U.S. Cl. ................................ 123/41.1; 123/41.29; 123/41.31; 123/41.33
[58] Field of Search ............................ 123/41.08–41.1, 123/41.31, 41.33, 41.29, 41.02; 60/599

[56] References Cited
U.S. PATENT DOCUMENTS

| | | | |
|---|---|---|---|
| 2,188,172 | 1/1940 | Brehob | 123/41.29 |
| 2,417,237 | 3/1947 | Chandler | 123/41.29 |
| 3,425,400 | 2/1969 | Scherenberg | 123/41.08 |
| 3,752,132 | 8/1973 | Bentz et al. | 123/41.1 |
| 4,061,187 | 12/1977 | Rajasekaran et al. | 123/41.29 |
| 4,156,408 | 5/1979 | Protze | 123/41.09 |
| 4,325,219 | 4/1982 | Stang et al. | 60/599 |
| 4,352,342 | 10/1982 | Cser et al. | 123/41.29 |
| 4,370,950 | 2/1983 | Furukubo | 123/41.08 |
| 4,510,893 | 4/1985 | Schweiger et al. | 123/41.1 |
| 4,517,929 | 5/1985 | Musick et al. | 123/41.1 |
| 4,550,692 | 11/1985 | Crofts, Sr. | 123/41.1 |

Primary Examiner—William A. Cuchlinski, Jr.
Attorney, Agent, or Firm—Neuman, Williams, Anderson & Olson

[57] ABSTRACT

A cooling system for an internal combustion engine is provided wherein coolant subsequent to flowing through the engine is selectively directed through one of two circuits or simultaneously through both circuits dependent upon the temperature of the coolant at predetermined locations within the system. One of the circuits includes a thermostatically controlled primary valve downstream of the engine unit and having an inlet port communicating therewith; a first bypass line having an upstream end connected to one outlet port of said valve; a radiator with a common inlet header and an outlet header with segregated segments, the inlet header being connected to a second outlet port of the valve; and an aftercooler downstream of the radiator and having an inlet side communicating with one segment of the radiator outlet header and a downstream end of the first bypass line. The aftercooler has an outlet side communicating with an intake side of a coolant pump. The second circuit includes a second bypass line communicating at an upstream end with the inlet port of the primary valve and having a downstream end connected to an inlet port of a thermostatically controlled secondary valve. The secondary valve has a second inlet port connected to a second segment of the radiator outlet header and an outlet port communicating with the pump intake side. The coolant flow rate through the first circuit being substantially less than through the second circuit.

13 Claims, 5 Drawing Figures

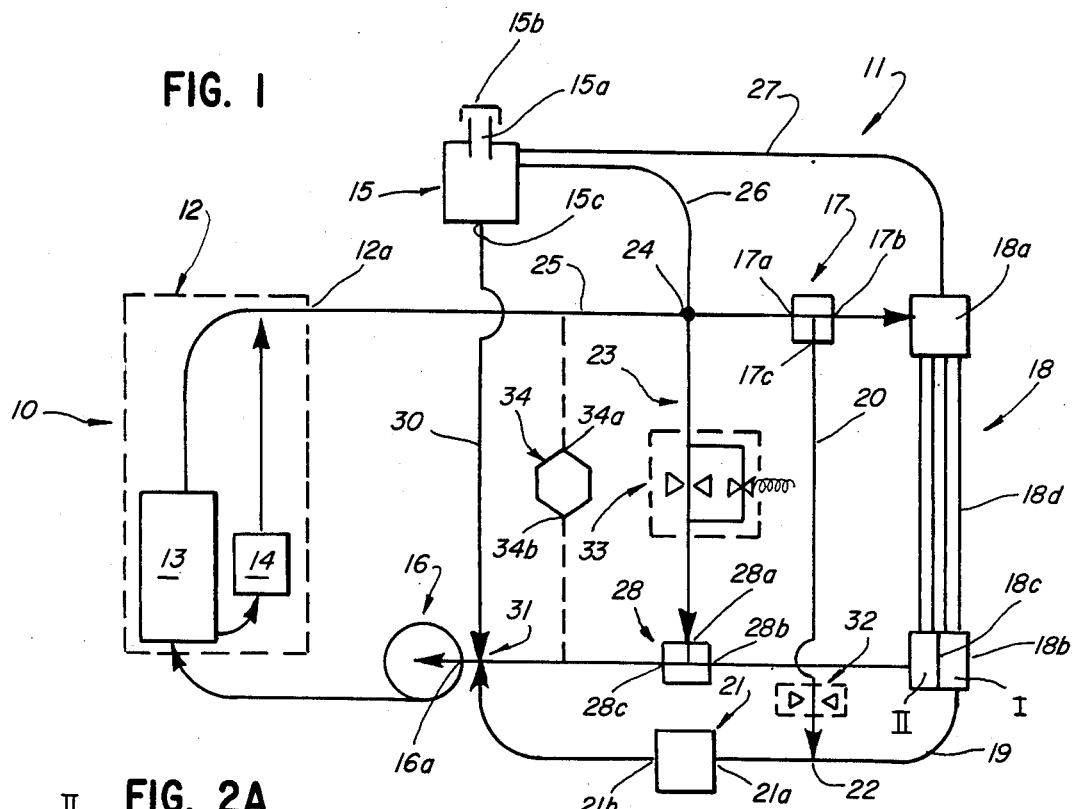
FIG. 1
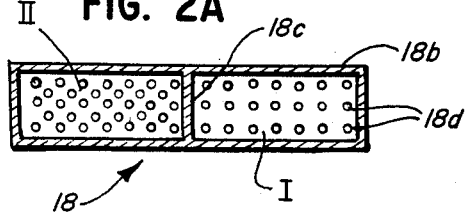
FIG. 2A
FIG. 3a
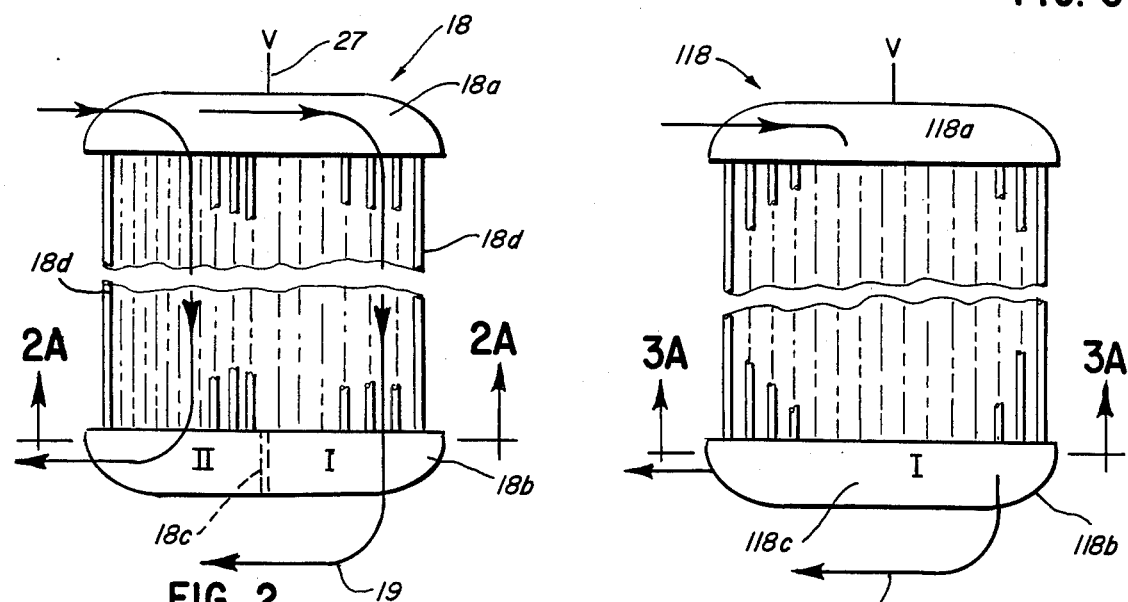
FIG. 2
FIG. 3

TWIN-FLOW COOLING SYSTEM

BACKGROUND OF THE INVENTION

Various twin-flow cooling systems for internal combustion engines have heretofore been proposed; with the general objective of cooling the charge air to a lower temperature than is possible with a single flow circuit; however, because of certain inherent design characteristics they have been beset with one or more of the following shortcomings:

(a) the system incorporates a separate pump for each flow circuit; (b) the system incorporates a separate radiator for each circuit; (c) where a single radiator is utilized for both circuits, care must be exercised to prevent leakage between sections of the radiator because of the substantial pressure differential which exists between the circuits; (d) the initial cost of the various components of the system and the installation and maintenance costs relating thereto are inordinately high; and (e) there is substantial heat loss during the period of engine warm-up.

SUMMARY OF THE INVENTION

It is an object of the invention to provide a twin-flow cooling system for an internal combustion engine which avoids all of the aforenoted shortcomings of prior systems.

It is a further object to provide an improved cooling system utilizing a single low-flow radiator which does not require special vent check valves.

It is a further object to provide an improved cooling system which utilizes a single radiator of simple inexpensive construction.

It is a still further object to provide an improved cooling system which utilizes a low pressure, low horsepower coolant pump.

It is a still further object to provide an improved cooling system which is readily responsive to widely variable engine operating conditions.

Further and additional objects will appear from the description, accompanying drawings and appended claims.

In accordance with one embodiment of the invention an improved twin-flow cooling system is provided for an internal combustion engine, such as a diesel engine. The system includes a common source of liquid coolant and a pump for circulating the coolant through an engine unit and then selectively through one of two circuits or simultaneously through both circuits dependent upon the temperature of the coolant at predetermined locations within the system. One of the circuits includes a thermostatically controlled primary valve downstream of the engine unit and having an inlet port communicating with the exit or outlet side of the engine unit; a first bypass line connected to one outlet port of the primary valve; a radiator having a common inlet header, connected to a second outlet port of the primary valve, and an outlet header with segregated segments; and an aftercooler downstream of the radiator and having an inlet side communicating with one segment of the radiator outlet header and with a downstream end of the first bypass line. The outlet side of the aftercooler communicates with the intake side of the pump. The second circuit of the improved cooling system includes a second bypass line having an upstream end communicating with the inlet port of the primary valve and a downstream end connected to an inlet port of a thermostatically controlled secondary valve. The secondary valve has a second inlet port connected to a second segment of the radiator outlet header, and an outlet port communicating with the pump intake side. The operation of the thermostatically controlled primary and secondary valves being responsive to the coolant temperatures at predetermined locations within the system. The coolant flow rate through the first circuit is substantially less than through the second circuit.

DESCRIPTION

For a more complete understanding of the invention reference should be made to the drawings wherein:

FIG. 1 is a schematic view of an internal combustion engine with one embodiment of the improved twin-flow cooling system shown associated therewith.

FIG. 2 is a schematic view of a two section radiator forming a component of the cooling system of FIG. 1.

FIG. 2a is a fragmentary sectional view taken along line 2a—2a of FIG. 2.

FIG. 3 is similar to FIG. 2 but showing a modified form of radiator.

FIG. 3a is similar to FIG. 2a but taken along line 3a—3a of FIG. 3.

Referring now to the drawings and more particularly to FIG. 1, a diesel engine 10 is shown which embodies one form of the improved cooling system 11. The engine, as illustrated, includes an engine unit 12, shown in dotted lines, provided with a cooling jacket 13 for the engine block and an oil cooler 14. The jacket and oil cooler are shown connected in parallel relation.

The improved cooling system 11 includes a source of liquid coolant which is in the form of an expansion tank 15. The tank is provided with a fill port 15a which is normally closed by a cap 15b. The cap is of conventional design and permits continuous venting of any air or gas which accumulates within the upper portion of the tank. The system 11 is also provided with a single conventional pump 16 for circulating the coolant through the engine unit 12 and the system 11. The coolant flow through the engine coolant jacket is about 100 gpm for engines having a rated horsepower within a range from about 300 to about 400. A thermostatically controlled primary or first valve 17 is disposed downstream of the engine unit and has an inlet port 17a communicating with an outlet port 12a of the unit. The primary valve 17 has one outlet port 17b connected to an inlet header 18a of a radiator 18 and a second outlet port 17c connected to the upstream end of a first bypass line 20.

Radiator 18 is preferably air cooled and is provided with an outlet header 18b which is separated into two segments I and II by a short transverse internal baffle or partition 18c, see FIGS. 2 and 2a. The headers 18a and 18b may be connected by sets of suitable tubing 18d arranged in spaced parallel relation. One set of tubing is connected to header segment I and the other set to segment II. Segment I of the radiator outlet header 18b communicates with an inlet port 21a of a conventional aftercooler 21. An outlet port 21b of the aftercooler communicates with the intake side 16a of pump 16.

A downstream end of the first bypass line 20 is connected by a connector 22 to a line 19 which joins the outlet header segment I to the inlet port 21a of aftercooler 21.

A second bypass line 23 is provided which has an upstream end connected by a connector 24 to a line 25 which interconnects the outlet port 12a of the engine unit 12 with inlet port 17a of primary valve 17. A vent line 26 interconnects connector 24 with the upper portion of tank 15. A second vent line 27 connects the radiator inlet header 18a with the upper portion of tank 15. Because both outlet header segments I and II communicate with the common inlet header 18a which in turn is vented to tank 15, there is no significant pressure differential between segments I and II and thus, leakage of the coolant between the flow circuits does not present a problem.

A downstream end of the second bypass line 23 is connected to an inlet port 28a of a thermostatically controlled secondary valve 28. A second inlet port 28b of valve 28 is connected to outlet header segment II of radiator 18. An outlet port 28c of valve 28 communicates with the intake side 16a of pump 16.

Tank 15 is provided with a port 15c which is connected by line 30 to a connector 31 disposed upstream of the pump intake side 16a. As seen in FIG. 1, the connector 31 has one inlet port connected to the outlet port 21b of the aftercooler and a second inlet port connected to valve outlet port 28c. Besides providing a means for venting air or gas from the system, tank 15 serves as an expansion tank for the coolant and as a means for replenishing any coolant lost by evaporation or the like in either circuit.

The first bypass line 20 may be provided with an adjustable control orifice 32 which controls the coolant flow through the line 20 and thus, prevents over-cooling of the engine by the aftercooler 21 during the warm-up period of engine operation thereby reducing heat loss.

An adjustable control orifice 33 may be provided in the second bypass line 23 which balances the flow of the coolant through the engine unit 12 in relation to the designed rate of flow of the coolant through the engine under certain operating conditions.

If desired, a portion of the circulating coolant, when heated to a high temperature by the engine unit 12, may be diverted to a cab heater 34 or other accessory equipment. The cab heater is connected in parallel with the second bypass line 23. The inlet side 34a of the cab heater is connected to line 25 upstream of connector 24. The outlet side 34b of the cab heater communicates with the outlet port 28c of secondary valve 28.

FIGS. 3 and 3a disclose a modified radiator 118 which may be substituted for radiator 18 previously described. The principal structural difference between radiator 18 and 118 is that the header tank baffle 18c or 118c is located so as to segment the radiator core in different ways. In radiator 18, short baffle 18c segments the radiator by columns or sets of tubes; in radiator 118, a long baffle, 118c segments the radiator core by rows of tubes. The flexibility provided allows a wide choice of arrangement of air and coolant flows, according to the particular heat exchange requirements.

The improved cooling system 11 incorporates three principal circuits. One circuit, sometimes referred to as the conventional engine circuit, includes the engine unit 12, cab heater 34 or other accessory equipment and the pump 16.

A second circuit, referred to as the primary cooling circuit, includes, in addition to the engine circuit components, the primary valve 17, outlet header segment I of the radiator 18 or 118 and the aftercooler 21. The coolant flow through the primary cooling circuit is normally low-flow varying from 1 to 2 gpm during the engine warm-up mode to a maximum of 9 to 12 gpm when the engine is operating within a normal speed range and under normal load demands. During the latter condition, valve 17 diverts substantially all of the coolant flow away from bypass line 20.

A third principal circuit, referred to as the secondary cooling circuit, includes besides the components of the engine circuit, outlet header segment II of radiator 18 or 118, and the secondary valve 28. Coolant flow through the third circuit occurs when high coolant temperatures exist and additional cooling is required beyond that attainable with flow only through the second circuit, above described. The coolant flow rate through the third circuit (e.g. 18-25 gpm) is substantially greater than through the second circuit and thus, greater cooling demands can be met. It is preferred that secondary valve 28 permit continuous but limited coolant flow through bypass line 23 even when there is flow through the radiator outlet header segment II.

During the engine warm-up period, there is a very low flow rate of the coolant through the primary cooling circuit resulting in quick heat-up of the engine components thereby avoiding poor fuel combustion. The flow rate during this period is principally controlled by adjustment of the control orifice 32.

When the engine is operating under moderate load demands and/or moderate ambient temperatures, the coolant flows through the primary cooling circuit is capable of handling all of the engine cooling requirements. It should again be noted that during this period and during the warm-up period there is also limited coolant flow through bypass line 23 and valve 28.

During high cooling demands (e.g., coolant temperatures of about 200° F. and above at the outlet side of the engine unit 12) there is coolant flow through both segments I and II of the radiator outlet header. The coolant flow rate through the second segment II is normally substantially greater (e.g. 150%) than through the first segment I.

The control orifice 33 provided in bypass line 23 may include a restrictor valve which can be activated so as to increase substantially (e.g. 100%) the total coolant flow through the radiator 18 or 118. In such a situation, the aftercooler will operate as an additional radiator when a retarder cooler is fitted in the circuit.

Thus, a cooling system has been disclosed which utilizes a single coolant pump and a single radiator with a segmented outlet header, each of which forms a component in both a low flow primary cooling circuit and a secondary cooling circuit. Furthermore, the coolant flow in each circuit is regulated by an independent thermostatically controlled valve so that on high cooling demand the secondary circuit provides an increased systemic coolant flow through all segments of the radiator outlet header. Accordingly, the improved cooling system is of simple design, easy to install and maintain and is capable of effectively meeting cooling demands which vary over a wide range. The size of the various components and the location thereof relative to one another and to the engine itself may vary from that illustrated and above-described without departing from the scope of the invention.

I claim:

1. A twin flow cooling system for an internal combustion engine; comprising a common source of liquid coolant; a pump having an intake side communicating with said source for circulating said coolant throughout the system; an engine unit having a cooling jacket connected to a discharge side of said pump; a thermostatically controlled primary valve downstream of said engine unit and having an inlet port communicating therewith; a radiator downstream of said primary valve, said radiator having a common inlet header and an outlet header having segregated segments, said radiator inlet header being connected to a first outlet port of said primary valve; a first bypass line having an upstream end connected to a second outlet port of said primary valve; a thermostatically controlled secondary valve having a first inlet port connected to a downstream end of a second bypass line, an upstream end of said second bypass line communicating with the inlet port of said primary valve, said secondary valve having a second inlet port connected to one segment of the radiator outlet header and an outlet port communicating with the intake side of said pump; vent means having at least a portion thereof communicating with the radiator inlet header; and an aftercooler having an inlet side communciating with a second segment of the radiator outlet header and an outlet side communicating with the intake side of said pump and at a location downstream of said secondary valve, said first bypass line having a downstream end communicating with the inlet side of said aftercooler; said primary and secondary valves coacting with one another whereby when the engine operating temperature is within a first range there is low coolant flow through the primary valve, the first bypass line and the aftercooler and simultaneously therewith full coolant flow through said second bypass line and the secondary valve; when the engine operating temperature is within a second range, there is coolant flow through the second bypass line and secondary valve and simultaneously therewith through the primary valve, through both the first bypass line and one segment of the radiator outlet header and then through the aftercooler; and when the engine operating temperature is within a third range there is coolant flow through the primary valve, through both segments of the radiator outlet header and simultaneously through the secondary valve and the aftercooler.

2. The cooling system of claim 1 wherein there is continuous coolant flow through the second bypass line and said secondary valve when the engine operating temperature is in any one of the said ranges.

3. The cooling system of claim 1 wherein the second bypass line includes a restrictor valve operative to effect reduced coolant flow through said second bypass line only when the engine operating temperature is in said third range.

4. The cooling system of claim 1 wherein the coolant flow through the engine cooling jacket is about 100 gpm for engines having a rated horsepower within a range from about 300 to about 400.

5. The cooling system of claim 4 wherein the coolant flow to the inlet side of the aftercooler varies from a minimum of about 1 gpm to a maximum of about 12 gpm.

6. The cooling system of claim 1 wherein the vent means is continuously open and at least a second portion thereof is in communication with the coolant leaving the engine unit.

7. The cooling system of claim 1 wherein the engine unit includes an oil cooler connected in parallel with a cooling jacket.

8. The cooling system of claim 1 wherein the first bypass line includes a control orifice restricting coolant flow through said first bypass line and said aftercooler when said engine is operating at substantially no load and at high idling speed.

9. The cooling system of claim 1 wherein there is substantially no pressure differential between the radiator outlet segments when coolant is simultaneously flowing therethrough.

10. The cooling system of claim 1 wherein the adjustment of said primary and secondary valves is dependent upon the temperature of the coolant at predetermined locations within the system.

11. The twin flow cooling system for an internal combustion engine comprising a common source of liquid coolant; a pump having an intake side communicating with said coolant source for circulating said coolant through said engine and through a primary cooling circuit and/or a secondary cooling circuit in response to predetermined cooling demands of the engine; said primary cooling circuit including a thermostatically controlled first valve having an inlet port communicating with a coolant discharge side of the engine, a radiator downstream of said first valve, said radiator having an inlet header and an outlet header partitioned into at least two segments, said inlet header communicating with a first outlet port of said first valve, one segment of the outlet header communicating with an inlet side of an aftercooler, an outlet side of the aftercooler communicating with the pump intake side, and a first bypass line having an upstream end communicating with the first outlet port of said first valve and a downstream end communicating with the inlet side of said aftercooler; said secondary cooling circuit including a second bypass line having an upstream end communicating with the coolant discharge side of the engine, a thermostatically controlled second valve having a first inlet port communicating with a downstream end of the second bypass line, a second inlet port communicating with a second segment of the radiator outlet header, and an outlet port communicating with the pump intake side.

12. The cooling system of claim 11 wherein a coolant expansion tank has an outlet port communicating with the intake side of the pump.

13. The cooling system of claim 12 wherein the inlet header of the radiator is connected by a vent line to the upper portion of said tank.

* * * * *